United States Patent [19]

Elton et al.

[11] Patent Number: 5,066,881

[45] Date of Patent: Nov. 19, 1991

[54] SEMI-CONDUCTING LAYER FOR INSULATED ELECTRICAL CONDUCTORS

[75] Inventors: Richard K. Elton, Altamont; William R. Schultz, Jr., Schenectady, both of N.Y.

[73] Assignee: General Electric Company, Schenectady, N.Y.

[21] Appl. No.: 555,621

[22] Filed: Jul. 23, 1990

Related U.S. Application Data

[62] Division of Ser. No. 351,235, May 15, 1989, which is a division of Ser. No. 643,908, Aug. 23, 1984, Pat. No. 4,853,565.

[51] Int. Cl.$^5$ .............................................. H02K 3/14
[52] U.S. Cl. ...................................... 310/213; 310/45; 310/208; 310/215; 174/34; 174/102 SC; 174/106 SC; 174/120 SC; 336/84 C
[58] Field of Search .................. 310/213, 214, 215, 45, 310/186, 208; 174/34, 114 R, 102 SC, 106 SC, 120 SC; 336/84 C, 18 T; 552/505, 511; 428/212

[56] References Cited

U.S. PATENT DOCUMENTS

| | | | |
|---|---|---|---|
| 2,409,893 | 10/1946 | Pendleton et al. | 201/76 |
| 3,158,770 | 11/1964 | Coggeshall et al. | 310/214 |
| 3,354,331 | 11/1967 | Broeker et al. | 310/196 |
| 3,891,880 | 6/1975 | Britsch | 310/196 |
| 3,947,278 | 3/1976 | Youtsey | 106/26 |
| 3,974,314 | 8/1976 | Fuchs | 428/212 |
| 4,001,616 | 1/1977 | Loneseth | 310/45 |
| 4,107,092 | 8/1978 | Carnahan et al. | 252/511 |
| 4,207,482 | 6/1980 | Neumeyer | 310/196 |
| 4,308,476 | 12/1981 | Schuler | 310/45 |
| 4,369,389 | 1/1983 | Lambrecht | 310/214 |
| 4,403,163 | 9/1983 | Armerding et al. | 310/213 |
| 4,473,765 | 9/1984 | Butman | 310/45 |
| 4,510,077 | 4/1985 | Elton | 252/502 |

OTHER PUBLICATIONS

Brown Boveri Review, Jan, 1970, "Manufacturing and Testing of Roebel Bars", by P. Mart and R. Schuler, pp. 25-31.

Moses, G. L., Electrical Insulation, McGraw Hill, 1st Ed. 1951, pp. 2 and 3.

Primary Examiner—R. Skudy
Attorney, Agent, or Firm—Nixon & Vanderhye

[57] ABSTRACT

A semi-conducting pyrolyzed glass fiber layer equalizes the electrical potential on the exterior surface of an insulated conductor when the layer covers the surface. The layer prohibits the development of a corona discharge and bleeds off any electrical charge developed thereon when the layer is electrically coupled to a body having a known potential. The insulated conductor may be windings in a dynamoelectric machine.

2 Claims, 3 Drawing Sheets

SEMI-CONDUCTING LAYER FOR INSULATED ELECTRICAL CONDUCTORS

This is a division of application Ser. No. 07/351,235, filed May 15, 1989 which is, in turn, a divisional of application Ser. No. 643,908, now U.S. Pat. No. 4,853,565, filed Aug. 23, 1984.

BACKGROUND OF THE INVENTION

This invention relates to a semi-conducting pyrolyzed glass fiber layer covering an insulated electrical conductor which prohibits the development of a corona discharge when an electrical potential exists between the conductor and region adjacent the exterior surface of the insulator.

In many electrical devices, an electrical potential exists between a conductor and the regions immediately adjacent the exterior surface of an insulator surrounding the conductor. In a high powered electrical apparatus such as a dynamoelectric machine, the stationary armature core is generally made of laminations which define a cylindrical bore and which also define circumferentially spaced radial slots opening into the bore and axially extending substantially the length of the stator core. Heavily insulated electrical windings, or armature bars, are disposed in the slots. A high electrical potential difference exists between the windings or armature bars and the members of this stator defining the slots which are at an electrical ground.

The aforementioned large electrical potential difference may be sufficient to produce ionization of the gaseous medium in the region adjacent the exterior surface of the insulation surrounding the armature bars. This ionization tends to initiate arcing along the surface of the insulated armature bars which bridges the insulated path from the windings to the grounded stator laminations.

A similar problem has been recognized in the end turn region of the dynamoelectric machines. In that region, the insulated armature bars extend beyond the respective slots and one set of bars is circumferentially bent from top to bottom, to circumferentially displaced slot positions so as to provide a connection between one bar and another circumferentially spaced bar in the stator.

The ionization of the gas immediately adjacent the insulation of the armature bars is recognized as the production of a corona discharge. In the past, corona has been avoided by wrapping the insulated armature bars with a grounding tape which bleeds off the electric charge developed on the exterior surface of the insulator. The grounding tape is in electrical contact with the stator laminations. The grounding tape longitudinally extends the axial length of the bar in the stator slot as well as extends into a portion of the end turn region beyond the slot.

It is common to place the taped insulated armature bars in a resin bath and vacuum pressure impregnate the resin into the entire structure. This procedure may result in a change of the value of resistivity per square of the grounding tape, therefore, the ability of the tape to prevent corona is not entirely preserved. The change in resistivity of the grounding tape, when acted upon by resin, is well known in the art. Also, the grounding tape may abrade due to the vibration of the armature bar in the stator slot.

The development of a corona discharge in the region adjacent an insulated winding is not limited to dynamoelectric machines since this phenomenon has been noted in other electromagnetic machines such as large AC motors. In those machines, the insulated windings are disposed in longitudinally extending slots in the stator. Commonly, grounding tape is placed on the exterior surface of the insulation and is electrically in contact with the members of the stator defining the slot to minimize the possibility of a corona discharge similar in nature to that which occurs in dynamoelectric machines.

The development of a corona discharge and the resulting possibility of a flash over between the windings and the electrical ground adjacent to the exterior surface of the insulator is one extreme of the general problem of electrical charge buildup on the exterior of an insulated winding. This buildup of electrical charge is sometimes caused by the capacitive characteristics of the device. For example, cables carrying high voltages are sometimes subject to charge build-up on the exterior surface of the cable's insulation. Also, insulated conductors in transformers are affected by this capacitive charge build-up. The charge may also be a static electric charge. The grounding tapes utilized in prior art devices are not well suited to bleed off this electric charge unless the electrical apparatus is shaped such that the tape is in close contact with the entire insulated surface. For complex shapes, those shapes other than round or rectangular shapes with rounded corners, the grounding tape is not easily placed in close contact. In those situations, the portions of the exterior surface which are not in intimate contact may have an electrical charge buildup thereon since the tape does not bleed off the charge to ground.

Static charge build-up problems have been recognized as affecting sensitive electronic equipment, such as integrated circuit chips utilized in digital electronic equipment. The manufacture of these IC chips is generally sensitive to static charges on the conveyors, handling trays, racks and other means of packaging, handling, mounting and transporting. In the past, conductive paints were utilized to render the part, such as a plastic handling tray, semi-conducting. The tray was electrically grounded by an appropriate means to bleed off the static electric charge.

OBJECTS OF THIS INVENTION

It is an object of this invention to provide for a layer in intimate contact with the insulated windings of an electrical machine and in electrical contact with ground to bleed off charges thereon and to minimize the possibilities of a corona discharge.

It is an additional object of this invention to provide a semi-conducting layer which substantially maintains its value of resistivity after resin impregnation of the assembled insulated electrical winding.

It is a further object of this invention to provide for a semi-conducting pyrolyzed glass fiber material which can be laid over complex shapes to minimize voids and gaps between the layer and the insulation.

It is an additional object of this invention to provide means for maintaining a substantially uniform and equal electrical potential over the exterior surface of a substrate.

SUMMARY OF THE INVENTION

In one embodiment of the invention, a semi-conducting pyrolyzed glass fiber layer, having a resistivity in the range of 200 to 10,000,000 ohms per square, is disposed in intimate contact with the outer surface of the insulation of an insulated winding. The insulated winding is disposed in a slot along the axial length of an electrical machine. When an electric potential exists between the windings and the members of the electrical machine defining the slot, and the semi-conducting layer is in electrical contact with the slot members, the electric charge developed on the outer surface of the insulation is bled off to the slot members of the machine.

In another embodiment of the invention, a plurality of semi-conducting layer-like segments, having increasingly greater degrees of resistivity within the above-noted range, are sequentially disposed along the outer surface of the insulated windings which extend beyond the end of the slot.

Another embodiment of the invention utilizes a layer of semi-conducting pyrolyzed glass fiber as an internal grading layer disposed between an inner transposition filler material, which is proximate the transposed strands in an electrical winding, and the insulation surrounding the bundle of strands. The semi-conducting layer is in intimate mechanical and electrical contact with both strands. Other embodiments of the invention are detailed hereinafter.

BRIEF DESCRIPTION OF THE DRAWINGS

The subject matter which is regarded as the invention is particularly pointed out and distinctly claimed in the concluding portion of the specification. The invention, however, together with further objects and advantages thereof, may best be understood by reference to the following description taken in connection with the accompanying drawings in which:

DETAILED DESCRIPTION

Figure 1:
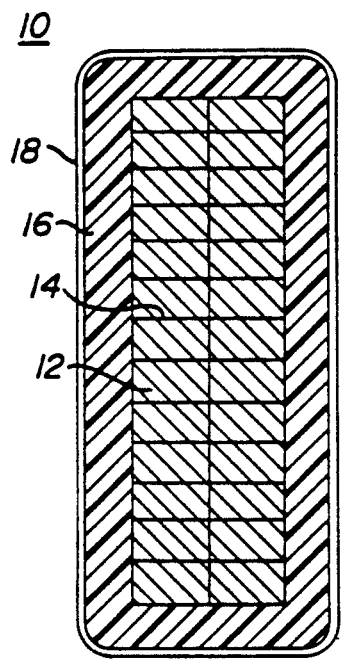
FIG. 1 is a cross sectional view of an insulated winding which has a layer of semi-conducting material substantially covering the outer surface of the insulation.

FIG. 1 illustrates a cross sectional view of an insulated electrical winding 10. Winding 10 includes a plurality of conductive elements or strands 12 positioned in two adjacent columns. Each strand is surrounded by strand insulation 14. A better understanding of the construction of an electrical winding is disclosed in U.S. Pat. No. 3,158,770, Coggeshall et al., which is incorporated herein by reference thereto. The bundle of strands is surrounded by heavy ground insulation 16. A layer 18 of semi-conducting pyrolyzed glass fiber is in intimate contact with and substantially covers the outer or exterior surface of insulation 16. Semi-conducting layer 18 has a resistivity in the range of 200 to 10,000,000 ohms per square. As used herein, the word "semi-conducting" refers to a material which has a resistivity intermediate that of a good insulator, which is recognized to have a resistivity in the range of $10^{12}$ ohms per square or more, and that of a good conductor, which is considered as having a resistivity of $10^{-1}$ ohms per square or less. The recommended range of resistivity for layer 18 is 200 to 100,000 ohms per square. It is to be recognized herein that the depth of layer 18, as illustrated in all the figures, is exaggerated for descriptive reasons. Also, it is to be recognized that layer 18 may be classified by some strict standards as an insulator. However, for purposes of understanding, layer 18 is shown as a distinct layer throughout the illustrations.

One method of making the semi-conducting pyrolyzed glass fiber, having a resistivity within the above-noted range, is to heat treat glass fibers in the substantial absence of oxygen and in the presence of an effective amount of organic compound to secure the desired semi-conducting characteristics. A detailed description of this method, and other comparable methods, of making the semi-conducting pyrolyzed glass fibers is disclosed in the copending application of Richard K. Elton entitled "Semiconductive Glass Fibers And Method", Ser. No. 548,338, now U.S. Pat. No. 4,510,077, filed on Nov. 3, 1983, and assigned to the same assignee as the present application and incorporated herein in its entirety by reference thereto.

Winding 10 may be constructed as is well known in the art by immersing the winding in a bath of resin and vacuum pressure impregnating the resin in the winding. Other methods of constructing the winding are also well known to those of ordinary skill in the art. Such impregnating procedure eliminates the voids and gaps between semi-conducting layer 18 and the outer or exterior surface of insulation 16. Experiments have shown that the resistivity of the semi-conducting layer before and after the resin impregnation does not substantially change as compared with the grounding tape in prior art devices.

When an electrical potential exists between the bundle of strands and the region immediately adjacent the exterior surface of insulation 16, semi-conducting layer 18, when in electrical contact with an electrical ground, bleeds off the electric charge on that surface. This bleeding off of the electric charge prohibits the development of a corona discharge in the region immediately adjacent the exterior surface of winding 10, thereby preventing the erosion of the insulation and decreasing the possibilities of a flash over through insulation 16 from the strands to an electrical ground proximate the exterior surface.

Semi-conducting layer 18 substantially covers the outer surface of insulation 16 thereby providing a uniform and equal potential over that surface.

Figure 2:
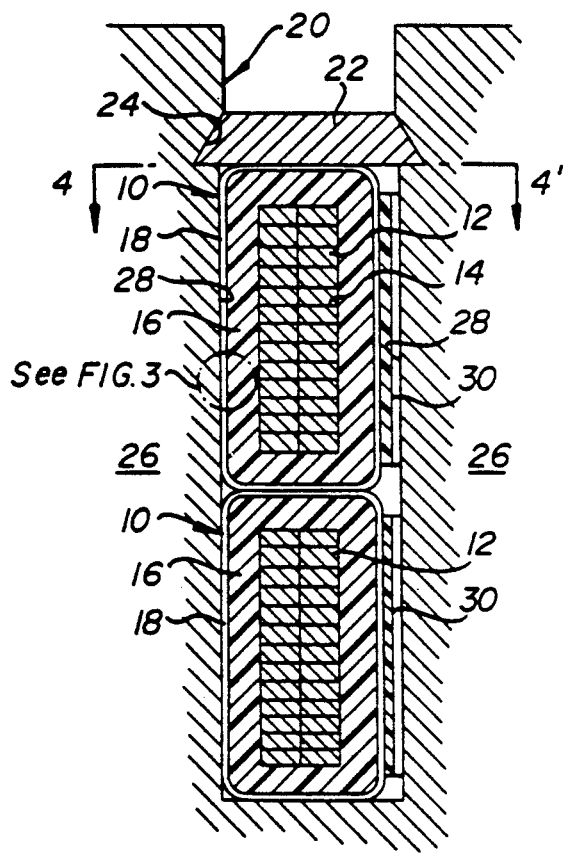
FIG. 2 is a cross sectional view of a slot of an electrical machine which holds two insulated windings.

FIG. 2 illustrates a cross sectional view of a slot 20 of an electrical machine. As is well known in the art, large electromagnetic machines, such as dynamoelectric machines and large AC motors, have an electrically grounded core defining axially extending, circumferentially spaced, radially directed slots. The slots are longitudinally extending both in the stator and rotor sections. The stator defines a cylindrical bore with the slots opening into the bore and the rotor is cylindrically shaped with the slots opening to the radially outer surface. A plurality of insulated electrical windings are disposed axially in these slots. As illustrated in FIG. 2, two insulated electrical windings, similar to winding 10, are disposed in slot 20. The resistivity range for semi-conducting layer 18 when covering the winding in the slot is between 200 and 100,000 ohms per square. Numerals designate similar elements in FIG. 1 and FIG. 2 and those designations are carried forward in FIGS. 3 and 4. The two windings are held in place by slot wedge 22 cooperating with dovetail groove 24 which is part of the retaining means.

In the illustrated example of a dynamoelectric machine, stator laminations 26 are the members defining slot 20. Laminations 26 are at an electrical ground. Semi-conducting layer 18 substantially covers both windings independently, extends along substantially the axial length of the machine and is in mechanical and electrical contact with laminations 26 therefore, the exterior surface of insulation 16 is at a substantially uniform and equal electrical potential.

As is well recognized in the art, the armature bars or electrical windings in a dynamoelectric machine's stator may vibrate due to the large electrical potential in the windings. To limit the vibrations, a ripple spring 30 is placed between one side of the windings and the adjacent slot wall 28. The spring is part of the retaining means. A detailed description of the ripple spring system is disclosed in the aforementioned Coggeshall U.S. Pat. No. 3,158,770. Ripple spring 30 may be a fiber glass reinforced spring with a semi-conducting pyrolyzed glass fiber layer or coating substantially covering the spring similar in nature to that described herein. The semi-conducting layer on the ripple spring insures that the development of a corona in that particular region of the slot is prohibited due to the layer's mechanical and hence electrical contact with slot wall 28 and the balance of the grounded core members.

Figure 3:
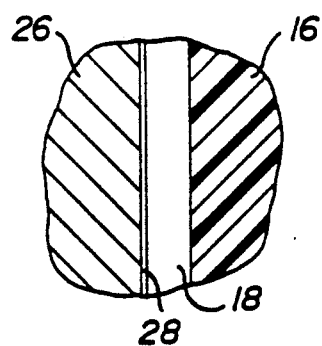
FIG. 3 is a magnified view of the cut-away area designated in FIG. 2.

FIG. 3 illustrates a magnification of the designated portion in FIG. 2. Semi-conducting layer 18 is in electrical contact with lamination 26 due to its mechanical contact with slot wall 28. The intimate contact between semi-conducting layer 18 and insulation 16 is produced by resin impregnation or other methods wherein both layer 18 and insulation 16 are bonded together by compatible resinous agents. The copending patent application of Elton, Ser. No. 548,338, now U.S. Pat. No. 4,510,077, discloses the attributes of the pyrolyzed glass fiber layer in greater detail.

The electrical windings for a large AC motor are substantially similar to that described with respect to the exemplary dynamoelectric machine described herein. Several insulated electrical windings are disposed in slots longitudinally defined by either the stator or the rotor of the motor. The insulated windings are substantially covered by the semi-conducting layer and placed within the slots. The semi-conducting layer is in electrical contact with the sides of the slots, and hence, a buildup of electrical charge on the exterior surface of the insulation is prohibited due to the electrical contact between the semi-conducting layer and the grounded slot members. As is recognized in the art, it is not always necessary to utilize a ripple spring in an AC motor.

Figure 4:
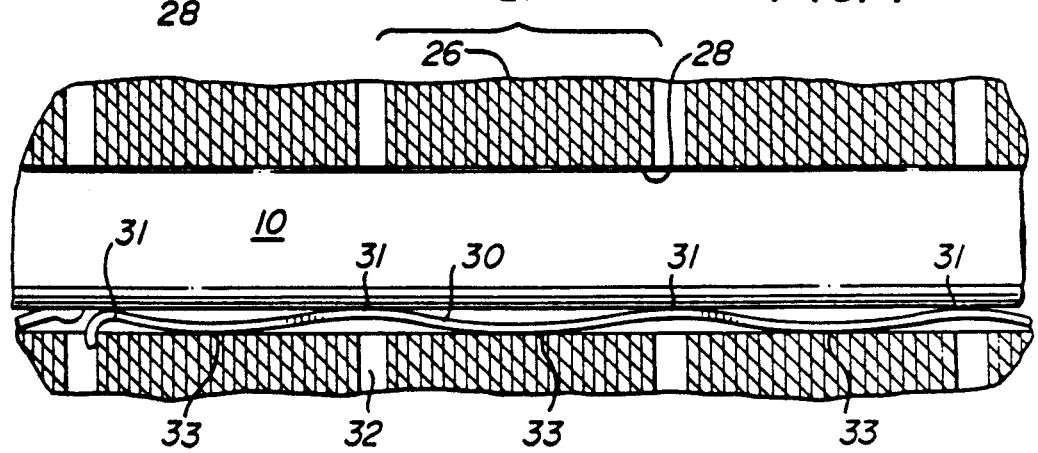
FIG. 4 is a longitudinal view of a cut-away portion of the insulated winding disposed in the slot as viewed from the perspective of section line 4—4' in FIG. 2.

FIG. 4 is a partial cut-away, longitudinal view taken from the perspective of section line 4—4' of FIG. 2. The stator laminations 26 of the exemplary dynamoelectric machine are grouped in packages 27 with cooling passages 32 therebetween. Ripple spring 30 contacts winding 10 at contact points 31 as designated and the spring contacts the laminations at contact points 33.

Figure 5:
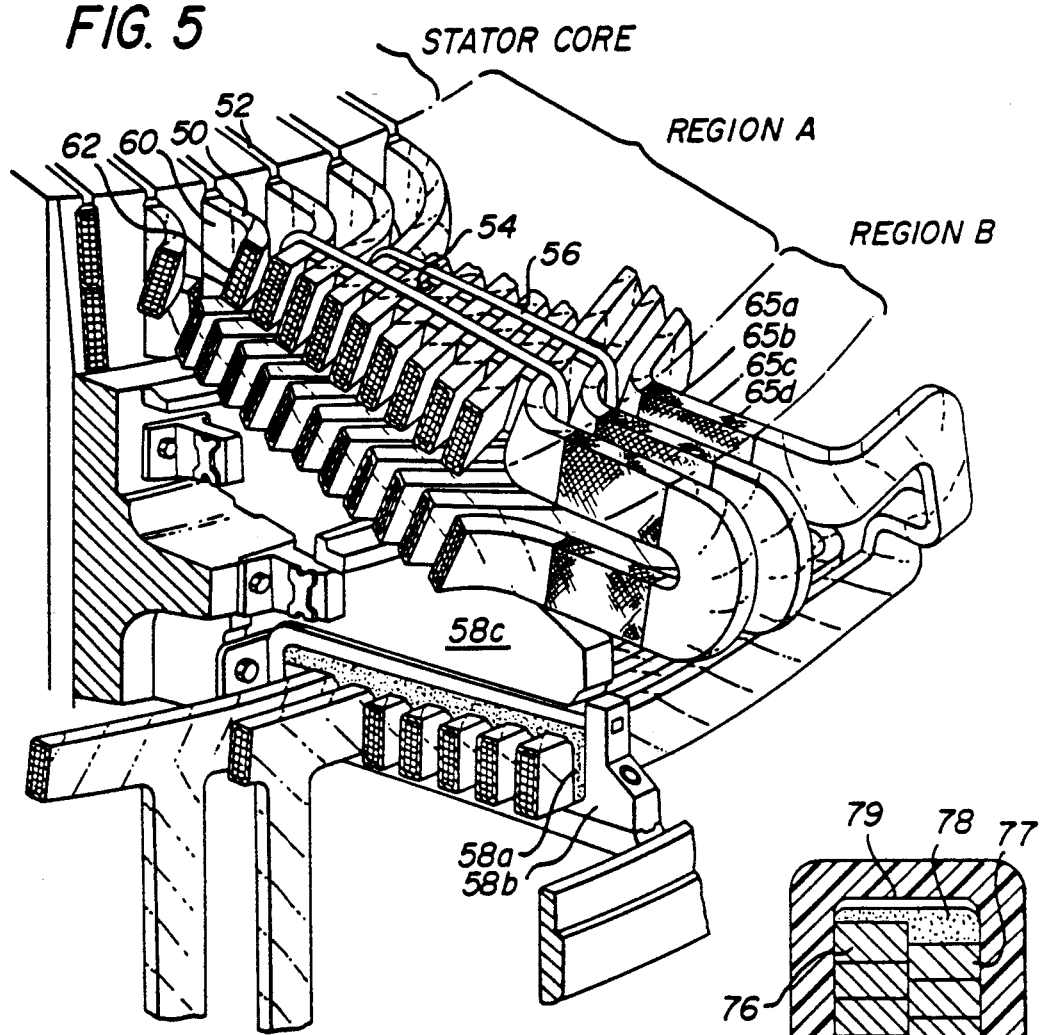
FIG. 5 is a perspective cutaway view of a portion of the end turn region of a dynamoelectric machine.

FIG. 5 illustrates a cut away perspective view of a portion of the end turn region at one end of a dynamoelectric machine. Armature bars or insulated electrical windings 50 extend beyond the stator core defining slots 52. Insulated electrical windings 50 initially extend axially and then bend circumferentially so as to provide a connection between one bar and a second circumferentially disposed bar in the stator core. A detailed description of the end turn region is disclosed in U.S. Pat. No. 3,354,331, Broeker et al., which is incorporated herein by reference thereto.

Various insulated blocks 54, ties 56, and axial brackets 58a, 58b and 58c provide support for the windings. The windings are insulated by heavy insulation 60. The portion of the insulated electrical windings in Region A are substantially covered with a semi-conducting pyrolyzed glass fiber layer 62 generally similar to semi-conducting pyrolyzed glass fiber layer 18 described herein. However, the range of resistivity of all semi-conducting layers beyond slot 52 is between 200 and 10,000,000 ohms per square. The semi-conducting layer 62 has substantially the same value of resistivity as does the semi-conducting layer throughout the axial expanse of the winding and, in Region A, is grounded to the stator core laminations by mechanical contact with those laminations. Region A extends a predetermined length beyond the end of slot 52.

Region B extends beyond the predetermined length of Region A. In Region B, a second plurality of semi-conducting pyrolyzed glass fiber layer-like segments 65a, 65b, 65c and 65d are utilized and each segment has an increasingly greater degree of resistivity than the preceding segment which in this region may be as high as approximately 10,000,000 ohms per square. The method of making the glass fiber with differing levels of resistivity is disclosed in Richard Elton's copending patent application Ser. No. 548,338, now U.S. Pat. No. 4,510,077. These segments are sequentially disposed along the length of the winding in Region B with increasing degrees of resistivity beginning with segment 65a, proximate the Region A. Therefore, the semi-conducting segment farthest from Region A, segment 65d, has a relatively higher value of resistivity than the semi-conducting segment proximate Region A, segment 65a. It is to be noted that the specific illustration of Region A and Region B is not limited to that shown and described herein but may be as described more fully in the Broeker U.S. Pat. No. 3,354,331. Broeker discloses that an electrical stress grading on the electrical windings beyond the grounded portion (Region A is the grounded portion herein) may be beneficial. Region B herein is meant to refer to the electrical stress grading region. Layer-like segments 65a, 65b, 65c and 65d are substantially similar to layer 18 except for their resistivities.

Figure 6:
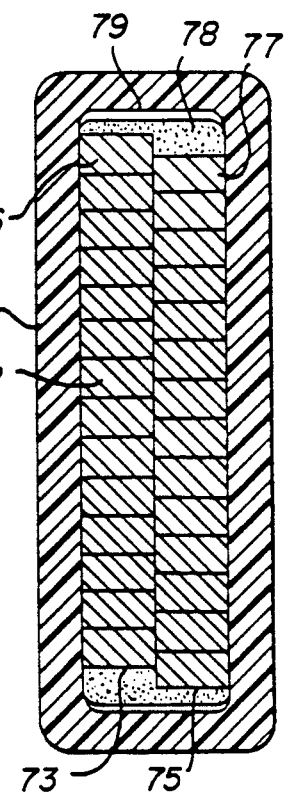
FIG. 6 is a cross sectional view of an insulated winding detailing an internal grading layer.

FIG. 6 is a cross sectional view of an electrical winding 70. A plurality of conductive strands 72 are bundled together in two adjacent columns 73 and 75 respectively. A first strand 76 of column 73 is transposed with respect to a second strand 77 of column 75. An inert transposition filler material 78 is disposed proximate strand 76 and strand 77 to round off that end portion of winding 70. Strand 76 is transposed with respect to strand 77 due to the stacking of the strands longitudinally and the cooling passages in the grouped strands as is commonly recognized for Roebel bars in dynamoelectric machines.

An internal grading layer includes a semi-conducting pyrolized glass fiber layer 79, having a resistivity in the range of 200 to 100,000 ohms per square, being disposed between transposition filler material 78 and a heavy insulation 80 which completely surrounds the rounded off, bundle of strands. The semi-conducting layer 79 is electrically coupled to strand 76 and strand 77 and in intimate contact with insulation 80.

As illustrated in FIG. 6, the bottom most strands of column 73 and column 75 are also transposed and a filler material rounds off that end. A semi-conducting pyrolyzed glass fiber layer caps that end of electrical winding 70 in a similar fashion to the aforementioned internal grading layer. Semi-conducting layer 79 provides an equal electrical potential about the end regions of electrical winding 70. However, it should be noted that semiconducting layer 79 need only be at one end of electrical winding 70 where the filler material is utilized.

Figure 7:
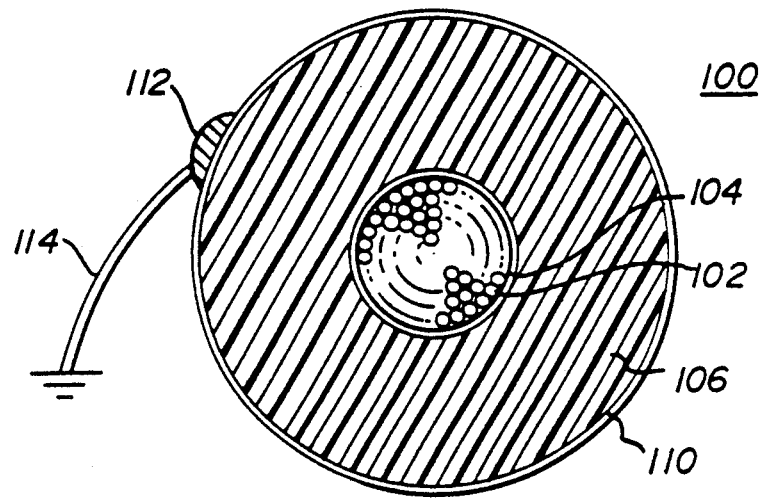
FIG. 7 is a cross sectional view of a cable.

FIG. 7 illustrates a cross sectional view of a cable utilizing a semi-conducting pyrolyzed glass fiber layer to equalize the electric charge on the exterior of the insulator of the cable and a semi-conducting layer utilized as an internal grading layer surrounding the conductors within the cable. Cable 100 includes a plurality of conductive strands 102 surrounded by an internal grading layer 104. The internal grading layer is a semi-conducting pyrolyzed glass fiber layer as disclosed herein. Internal grading layer 104 equalizes the electric charge about conductive strands 102.

An insulation 106 surrounds internal grading layer 104. On the external surface of insulation 106, a semi-conducting pyrolyzed glass fiber layer 110 equalizes the electrical potential thereon. Semi-conducting layer 110 is electrically connected by coupling means 112 to ground by wire 114. In a fashion similar to that described above, semi-conducting layer 110 bleeds off any static electric charge or electric charge developed on the exterior surface of insulation 106 due to an electrical potential difference between conductive strands 102 and the ambient environment. It is to be understood that cable 100 could utilize internal grading layer 104 without utilizing semi-conducting layer 110. Also, cable 100 could utilize semi-conducting layer 110 without including internal grading layer 104.

Figure 8:
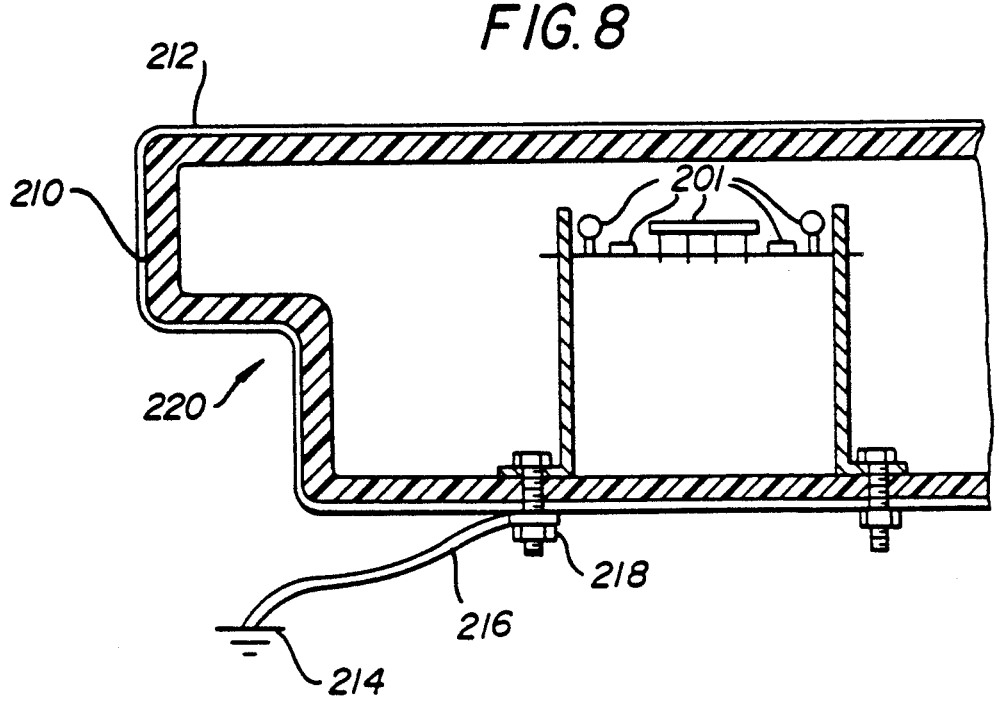
FIG. 8 is a cross sectional view of an electrical housing surrounding digital electronic equipment.

FIG. 8 is a cross sectional view of an electrical housing surrounding some digital electronic equipment. Electronic equipment generally designated as items 201 is housed within structure 210. To protect electronic components 201, the exterior surface of housing 210 has a layer 212 of semi-conducting pyrolyzed glass fiber. The semi-conducting layer 212 is substantially similar to the semi-conducting layers described hereinabove. Semi-conducting layer 212 is in electrical contact with ground 214 by coupling through wire 216 to the retaining means 218 in mechanical contact with semi-conducting layer 212. Those of ordinary skill in the art will recognize that if electrical components 201 are sensitive to electronic charges accumulating on housing 210, semi-conducting layer 212 will bleed off those electrical charges to ground 214 at described in detail hereinabove. Since semi-conducting layer 212 is composed substantially of a fiber glass material, layer 212 can intimately contact housing 210 in the region 220. Prior art grounding tapes may experience voids or gaps in region 220. It should be recognized that although semi-conducting layer 212 is shown as a distinct element from housing 210 in FIG. 8, a person or ordinary skill in the art would recognize that the entire housing 210 could be composed of the semi-conducting pyrolyzed fiber glass material.

The utilization of the semi-conducting glass fiber layer as described herein is only illustrative of a broad use of such material. When the semi-conducting layer is in electrical contact with an electrical ground, the layer prohibits the development of a corona discharge, and substantially bleeds off any electric charge developed on the exterior surface of a finite segment of an insulated conductor. Since the semi-conducting layer is a glass fiber which can be chopped, mixed with resin and molded, or blown on any complex shaped substrate, the layer can be placed in intimate contact with substantially all of the exterior surface of the insulator or housing and substantially all voids therebetween are eliminated when appropriate bonding agents are utilized. Hence, if the layer is in electrical contact with a body having a known electrical potential, the exterior surface of the covered substrate has a substantially uniform potential equal to that of the body. Although the examples herein only illustrate electrically grounded insulative bodies in combination with the semi-conducting layer, one of ordinary skill in the art will appreciate that any body having a known electrical potential may be coupled to the semi-conducting layer to eliminate the effects of ambient electrical fields or charges developed within or without the electrical conductor or encompassed components. The description of the electrical windings in a dynamoelectric machine is not meant to be limiting since these electrical windings have similar counterparts in many types of large motors and other electrical devices.

It is to be recognized that the semi-conducting pyrolyzed glass fiber layers may have differing levels of resistivity as described with respect to the end turn region of the dynamoelectric machine discussed herein. Those differing levels of resistivity can be utilized in an electrical grading system to relieve electrical stress created by the electrical windings being at a high potential relative the regions immediately adjacent the exterior of the insulation. Also, the semi-conducting pyrolyzed glass fiber layer can be placed in intimate contact with a number of materials by bonding the layer and material surface together by a compatible resin, bonding agent, or other appropriate means.

The above description details several embodiments of the invention, however, it is to be understood that various other modifications may be made therein and the claims are intended to cover all such modifications that fall within the true spirit and scope of the invention.

We claim:

1. An internal grading layer for an electrically conductive winding which includes a plurality of conductive strands bundled together in at least two adjacent columns and a first strand of said plurality of conductive strands being transposed with respect to a second strand of said plurality of conductive strands in an adjacent column, an inert transposition filler material disposed proximate said conductive first and second strands to round off that portion of the bundled together conductive strands, said bundled together conductive strands and said filler material being surrounded by an insulative material, the internal grading layer comprising:

a semi-conducting pyrolyzed glass fiber layer having a resistivity in a range of 200 to 10,000,000 ohms per square disposed between said filler material and said insulative material in intimate contact with said insulative material and electrically coupled to said conductive first and second strands.

2. A device in an electromagnetic machine comprising:

an electrically grounded core defining axially extending, circumferentially spaced, radially directed slots;

a plurality of insulated windings disposed in said slots, each winding including:

a plurality of conductive strands bundled together in at least two adjacent columns;

a first conductive strand of said plurality of conductive strands being transposed with respect to a second conductive strand of said plurality of conductive strands in an adjacent column;

an inert transposition filler material disposed proximate said first and second conductive strands to round off that portion of the bundled together conductive strands;

a semi-conducting pyrolyzed glass fiber layer, having a resistivity in the range of 200 to 10,000,000 ohms per square covering said filler material, being in intimate contact with an outer surface of said filler material and with an insulative material and being electrically coupled to at least said first and second conductive strands;

said insulative material substantially surrounding said windings; and means for retaining said insulated windings in said slots.

* * * * *